United States Patent [19]

Sarno

[11] Patent Number: 5,004,210
[45] Date of Patent: Apr. 2, 1991

[54] GATE VALVE

[75] Inventor: Russell J. Sarno, Tarzana, Calif.

[73] Assignee: Magic Plastics, Burbank, Calif.

[21] Appl. No.: 400,229

[22] Filed: Aug. 28, 1989

[51] Int. Cl.⁵ ............................................. F16K 3/02
[52] U.S. Cl. .................................... 251/279; 251/327
[58] Field of Search ...................... 251/279, 326, 327

[56] References Cited

U.S. PATENT DOCUMENTS

| | | | |
|---|---|---|---|
| 3,666,231 | 5/1972 | Parodi et al. | 251/297 X |
| 3,700,206 | 10/1972 | Jones | 251/297 X |
| 3,938,779 | 2/1976 | Benjamin | 251/327 X |
| 4,165,860 | 8/1979 | Gillespie | 251/297 |
| 4,548,386 | 10/1985 | Gladisch et al. | 251/327 |
| 4,592,534 | 6/1985 | Ueda et al. | 251/327 X |

Primary Examiner—John C. Fox
Attorney, Agent, or Firm—Donald D. Mon

[57] ABSTRACT

A gate valve having a pair of aligned flow passages with a common central axis, with a pair of seat mounts and respective seats facing each other, and forming the walls of a groove with a bottom, their sealing planes tapering toward one another. A riser rises above these seats, with a cap. An actuator rod slides through the cap and mounts and moves an unperforated gate to control flow through the seats. A releasable latch can join the cap and the gate to hold it in its most open position until overcome. A deformable nub is carried by the gate to act as a drag when the gate is moved.

10 Claims, 1 Drawing Sheet

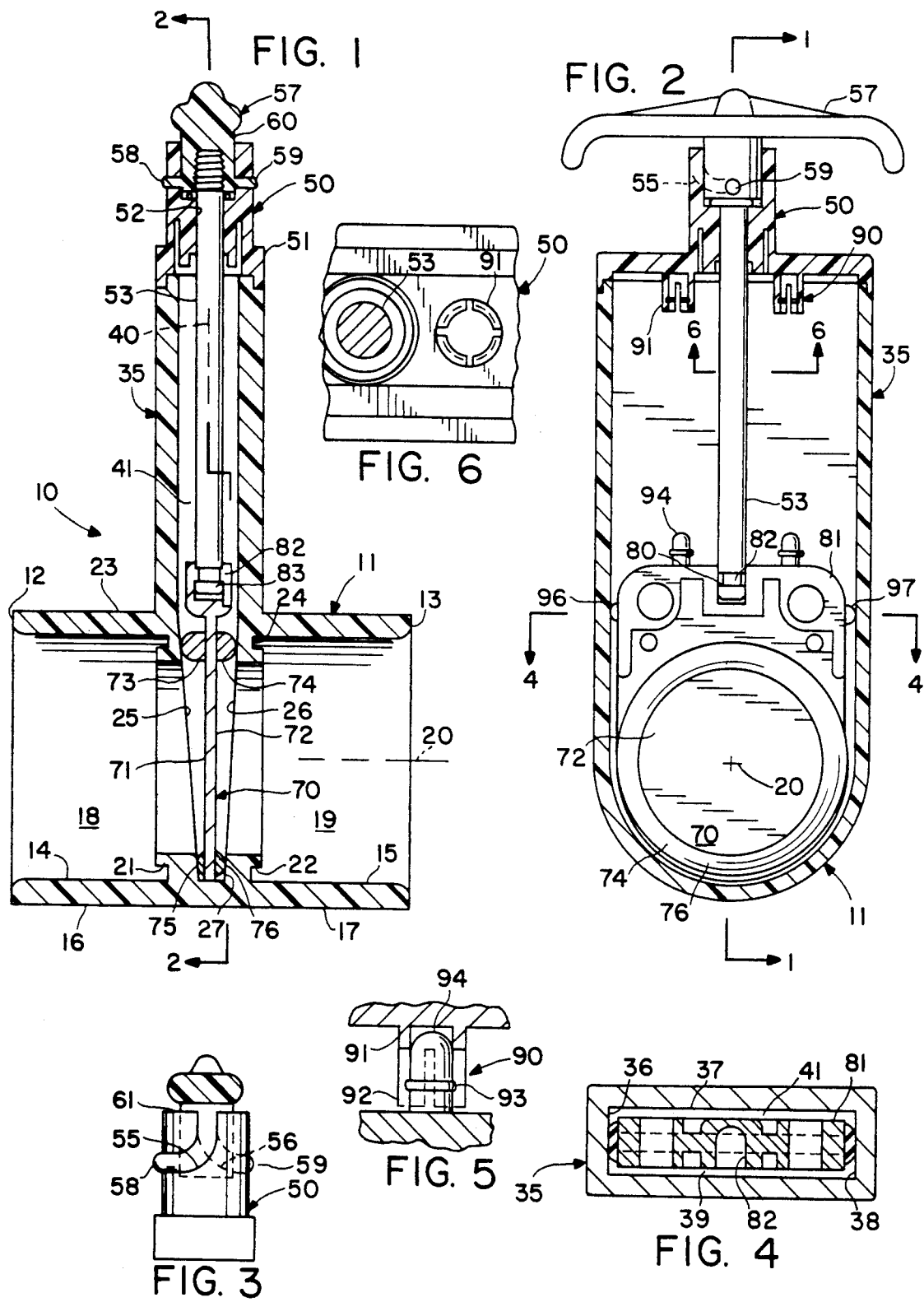

GATE VALVE

FIELD OF THE INVENTION

This invention relates to a gate valve to control the flow of fluid through a conduit.

BACKGROUND OF THE INVENTION

Gate valves are widely used to control the rate of flow of fluids through conduits, and especially to provide a shut-off capability. They vary widely in complexity, materials of construction, and cost. All too often reliability must be purchased by the use of more expensive materials of construction which frequently require costly machining processes.

It is an object of this invention to provide a gate valve which can principally be formed of injection molded parts made from organic plastic material. The major portion of the body, including its valve seats, are formed of a single molded piece. This includes a cap which can readily and reliably be joined to the body by solvent or heat welding. The cap and all other elements except for a single actuator rod, are molded parts. There results an economical and strong gate valve whose parts can expediently be assembled. The assembled valve is reliable and can provide features of reassurance to its users.

BRIEF DESCRIPTION OF THE INVENTION

A gate valve according to this invention has a unitarily cast body which incorporates a pair of conduits each with a flow passage having an axis, said axes being coincident. A pair of peripheral valve seats extend around the flow passages. The seats form the wall of a groove. They are spaced apart from and face one another. They are planar and their planes approach one another as they extend across the flow passages.

The integral body further includes a riser which extends from the flow passages, normal to the central axes. It forms an internal slide passage defined by surrounding walls. The slide passage enters the groove.

The integral body can be formed in a single injection which forms the riser and the conduits. A cap is later assembled to the riser to close the slide passage. It has an aperture through it to pass an actuator rod that extends from both sides of the cap and into the slide passage.

A gate has a pair of faces, with a peripheral seal on each face. They are so shaped and proportioned as to seat on the valve seats and close the flow passage when fully inserted into the groove. The actuator rod is coupled to the gate so as selectively to force the gate into the groove to close the gate valve to flow, or to pull the gate into the slide passage to remove the gate from the groove and open the gate valve.

Accordingly to a preferred but optional features of the invention, drag means may be carried by the gate to hold the gate from creeping, and latch means cooperative between the cap and the gate releasably to hold the gate in its open-to-flow position.

According to yet another preferred but optional feature of the invention, the cap and the actuator rod are provided with cam means effective to exert a strong closing force on the gate.

The above and other features of this invention will be fully understood from the following detailed description and the accompanying drawings in which:

BRIEF DESCRIPTION OF THE DRAWINGS

FIG. 1 is an axial cross-section of the presently preferred embodiment of the invention, taken at line 1—1 in FIG. 2;

FIG. 2 is a section taken at line 2—2 in FIG. 1;

FIG. 3 is a fragmentary view of a portion of the cap in FIG. 1;

FIG. 4 is a cross-section taken at line 4—4 in FIG. 2;

FIG. 5 is a fragmentary view, partly in cutaway cross-section showing the latch means; and FIG. 6 is a partial view taken at line 6—6 in FIG. 2.

DETAILED DESCRIPTION OF THE INVENTION

FIG. 1 shows a gate valve 10 according to the invention. It includes a unitary molded body 11 having a pair of conduits 12, 13, with a respective internal wall 14, 15 and a respective external wall 16, 17. The internal walls form respective flow passages 18, 19 which are coaxial on central axis 20. Either flow passage can be the inlet or the outlet of this valve.

Seat frames 21, 22 are circumferentially formed in flow passages 18, 19, respectively. Reliefs 23, 24 are formed for tooling purposes.

Valve seats 25, 26 are formed as spaced-apart sidewalls of a groove 27 between them. Both seats are planar and fully circumferential around the flow passages. They are formed on the seat frames. They taper toward one another as they extend across the central axis from top to bottom as illustrated in FIG. 1.

A riser 35 is an integral part of the molded body. It intersects the flow conduits at a location between them. It has four inside walls 36,37,38,39 extending along a slide axis 40. The walls bound a slide passage 41 which enters the flow passage region through the top of the groove. It can readily be seen that the body comprising the flow conduits, the riser and the valve seats can be made in one injection molding operation, using abutting cores for the flow passage and for the slide passage. The tapered shape of the valve sats lands itself to forming by the core which makes the slide passage.

A cap 50 is attached, such as by solvent welding or heat fusion, to the upper end 51 of the riser to close the slide passage. This is a later step in assembling the valve. The cap has a central aperture 52 with a peripheral O-ring seal to make a sliding seal with an actuator rod 53.

The cap includes a pair of cam tracks 55, 56 which curve around and along the axis of the slide passage. Rod 53 is rotatable. It has a handle 57 to turn it, and two cam followers 58,59. These followers project from a rod head 60 and fit in the cams. The cams have open ends 61, so that the followers are freed from them after a tightening or releasing at the lower end of the stroke of the rod.

A valve gate 70 has a pair of faces 71,72. It is a solid plate, It can either itself be tapered, or a pair of seals 73, 74 on its opposite face can be tapered. In either event, the contact lines 75,76 of the seals are fully circumferential, lie in respective planes, and match and seal with the valve seats when the valve gate is in the closed position shown in FIGS. 1 and 2. Thus, this gate is a blade-like element which enters and leaves the flow passages, under control of the actuator rod.

If preferred, the gate itself could be tapered, and the seals would have a uniform thickness. It is more expedient to cast the gate as a plate and apply tapered seals in a second operation.

Rotary joint 80 joins the gate and the rod. As best shown in FIGS. 2 and 4, a header 81 on the gate has a sidewardly-open slot 82 into which a head 83 on the rod can be snapped. Then the gate and the rod are rotatably and slidably held to each other.

The open or closed position of this valve can be learned by observing the extension of retraction of the actuator rod relative to the cap. However, many users of gate valves prefer more assurance that the valve will retain its adjusted position, and will not creep from it.

The closed-to-flow condition is straightforward. The cam and cam follower, when adjusted to the position shown in FIGS. 1 and 2, provide a positive locked closed-to-flow arrangement which will not change.

However, when the rod is in an axially shifted position there is less assurance. For this reason, latch means 90 is provided. As shown in FIGS. 2 and 5, latch means 90 includes a socket 91 having a plurality of springy latch fingers 92 adapted to snap over a bead 93 on a post 94. The socket is mounted to the cap, and the post is formed on the header (or on the gate). In the valve's open-to-flow position, shown in FIG. 5, the post will have engaged in the socket with an audible snap. This will retain the gate against creeping toward a valve-closed position, and will give the user some assurance. The latch can be overcome by a sharp push on the rod.

Further, drag means is provided by nubs 96, 97, which are deformable and in contact with walls of the slide passage. Thus, some conscious effort is needed to shift the gate, and drift or creep of the gate is prevented by these nubs. The nubs, like the valve seals, are made of resilient material attached to the respective support in a secondary operation such as molding or gluing.

The operation of this gate valve should be evident from the foregoing. Opening and closing the valve is accomplished by pulling or pushing on the actuator rod. Near the closed position the action is assisted in both directions by the cam assembly, and the valve will be held closed unless the handle is turned.

In the open position, the latch means acts to hold the setting. It takes a conscious effort to overcome the spring-type latching action.

In between, the drag means discourages or prevents creeping of the gate to a different setting.

More particularly it should be observed that with the exception of the actuator rod, which ordinarily should be made of metal, the entire gate valve assembly is made of simply molded and simply joined parts.

The body can be formed in a one-step injection molding process using three cores. The molded gate can have the valve seals molded to it or adhered to it, and can be assembled to the actuator rod merely by snapping the head of the rod into the slot in the gate. The cap can separately be formed and welded or cemented to the body.

That is all. All of the parts are elegantly simple, and easily assembled. The assembled valve provides every functional advantage of much more expensive valves, and at a remarkably lesser price.

This invention is not to be limited by the embodiment shown in the drawings and described in the description, which is given by way of example and not of limitation, but only in accordance with the scope of the appended claims.

I claim:

1. A gate valve comprising:

a unitary molded body having a pair of flow conduits, each having an internal wall defining a flow passage with a central axis, said axes being coincident, a pair of seat mounts between said flow passages, said seat mounts each supporting a respective valve seat, said valve seats facing each other and being spaced apart from one another to form the walls of a groove with a bottom, said valve seats being fully circumferential and each lying in a respective plane, said planes tapering toward each other as they extend across said flow passages, a riser having an actuation axis normal to said central axis, with a plurality of internal walls forming a slide passage extending along said actuator axis;

a cap closing said riser and having a shaft passage therethrough;

an actuator rod slidingly and sealingly fitted in said shaft passage, extending along said actuation axis projecting into said slide passage and past said cap;

an imperforate gate having a first and a second face, and a seal on each of said faces, said seals forming a planar line of sealing contact with said seats when fully inserted into said groove, said groove being aligned with said slide passage to enable the gate to be moved into said slide passage to open said valve; and in which said cap and said gate are releasably joinable by latch means which tend to restrain the gate in its most open position until overcome.

2. A gate valve according to claim 1 in which said gate and said cap are both molded structures, and the cap is joined integrally to the riser.

3. A gate valve according to claim 1 in which said actuator rod is also rotatable in said shaft passage.

4. A gate valve according to claim 3 in which said actuator rod includes a head, and said gate includes a sidewardly-open slot into which the head is pressed to join the rod to the gate.

5. A gate valve according to claim 1 in which said latch means comprises a post on one of said gate or cap and a springy socket on the other.

6. A gate valve according to claim 1 in which two of said internal walls are parallel and opposed to one another, and in which at least one deformable nub is carried by said gate to act as drag means yieldably resisting movement of the gate in the riser.

7. A gate valve according to claim 1 in which said gate includes a plate carrying said faces, said seals being tapered to form said planar lines of sealing contact.

8. A gate valve according to claim 1 in which said cap includes a cam track, and said actuator rod includes a follower, whereby twisting said rod moves said follower in said track to tighten the valve in its closed position.

9. A gate valve comprising:

a unitary molded body having a pair of flow conduits, each having an internal wall defining a flow passage with a central axis, said axes being coincident, a pair of seat mounts between said flow passages, said seat mounts each supporting a respective valve seat, said valve seats facing each other and being spaced apart from one another to form the walls of a groove with a bottom, said valve seats being fully circumferential and each lying in a respective plane, said planes tapering toward each other as they extend across said flow passages, a riser having an actuation axis normal to said central axis, with a plurality of internal walls forming a slide passage extending along said actuator axis;

a cap closing said riser and having a shaft passage therethrough;

an actuator rod slidingly and sealingly fitted in said shaft passage, extending along said actuation axis projecting into said slide passage and past said cap;

an imperforate gate having a first and a second face, and a seal on each of said faces, said seals forming a planar line of sealing contact with said seats when fully inserted into said groove, said groove being aligned with said slide passage to enable the gate to be moved into said slide passage to open said valve; and in which two of said internal walls are parallel and opposed to one another, and in which at least one deformable nub is carried by said gate to act as drag means yieldably resisting movement of the gate in the riser.

10. A gate valve according to claim 9 in which said cap includes a cam track, and said actuator rod includes a follower, whereby twisting said rod moves said follower in said track to tighten the valve in its closed position.

* * * * *